United States Patent
Farahati et al.

(10) Patent No.: US 10,948,027 B2
(45) Date of Patent: Mar. 16, 2021

(54) WET CLUTCH FRICTION PLATE

(71) Applicant: SCHAEFFLER TECHNOLOGIES AG & CO. KG, Herzogenaurach (DE)

(72) Inventors: Rashid Farahati, Copley, OH (US); Murat Bakan, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 146 days.

(21) Appl. No.: 16/296,383

(22) Filed: Mar. 8, 2019

(65) Prior Publication Data
US 2020/0284303 A1    Sep. 10, 2020

(51) Int. Cl.
F16D 13/64    (2006.01)
F16D 69/00    (2006.01)
F16D 65/12    (2006.01)

(52) U.S. Cl.
CPC .......... *F16D 13/648* (2013.01); *F16D 65/127* (2013.01); *F16D 2069/002* (2013.01); *F16D 2250/0038* (2013.01)

(58) Field of Classification Search
CPC .... F16D 13/64; F16D 13/648; F16D 65/0037; F16D 65/127; F16D 2069/002; B32B 2305/30; B32B 2475/00
USPC ...................................................... 192/107 M
See application file for complete search history.

(56) References Cited

U.S. PATENT DOCUMENTS

| | | | | |
|---|---|---|---|---|
| 4,792,361 A | * | 12/1988 | Double | F16D 69/02 106/36 |
| 6,116,395 A | * | 9/2000 | Ohkubo | F16D 13/64 192/107 C |
| 9,109,640 B2 | | 8/2015 | Reiners | |
| 2013/0153358 A1 | | 6/2013 | Chavdar et al. | |
| 2017/0335913 A1 | | 11/2017 | Farahati et al. | |
| 2018/0017122 A1 | | 1/2018 | Dong et al. | |
| 2019/0011006 A1 | | 1/2019 | Dong et al. | |

FOREIGN PATENT DOCUMENTS

| | | | |
|---|---|---|---|
| CN | 201401457 Y | 2/2010 | |
| DE | 102011109452 A1 | 2/2013 | |
| DE | 102017123580 A1 | 5/2018 | |
| EP | 0267027 A2 * | 5/1988 | ........... F16D 13/648 |
| JP | 2004011836 A | 1/2004 | |

OTHER PUBLICATIONS

International Search Report PCT Application No. PCT/US2020/020257, dated Jun. 25, 2020, 3 pages.

* cited by examiner

*Primary Examiner* — Richard M Lorence
(74) *Attorney, Agent, or Firm* — Brooks Kushman P.C.

(57) ABSTRACT

A friction plate for a clutch includes a face and a first friction material disposed on the face. The first friction material has a first composition including a first filler material at a first weight concentration of a total weight of the first friction material. A second friction material is disposed on the face and has a second composition that is different than the first composition and including a second filler material at a second weight concentration of a total weight of the second friction material. The second weight concentration is higher than the first weight concentration.

20 Claims, 2 Drawing Sheets

1

WET CLUTCH FRICTION PLATE

TECHNICAL FIELD

The present disclosure relates to friction plates for wet clutches and more specifically to friction materials of the friction plate.

BACKGROUND

A vehicle may include one or more wet clutches used to transfer power from one component to another. For example, a wet clutch may be used in a dual-clutch transmission to transfer power from an engine to a gear box. A wet clutch typically includes one or more clutch packs having friction plates interleaved with steel plates. The friction plates are coated with a friction material that cooperates with a lubricant (automatic transmission fluid) to create frictional engagement between the friction plates and the steel plates when the clutch pack is collapsed to engage the clutch.

SUMMARY

According to one embodiment, a friction plate for a clutch includes a face and a first friction material disposed on the face. The first friction material has a first composition including a first filler material at a first weight concentration of a total weight of the first friction material. A second friction material is disposed on the face and has a second composition that is different than the first composition and including a second filler material at a second weight concentration of a total weight of the second friction material that is higher than the first weight concentration.

According to another embodiment, a method of manufacturing a friction plate includes applying a first friction material to a face of a pressure plate. The first friction material has a first composition including a first filler material at a first weight concentration of a total weight of the first friction material. The method further includes applying a second friction material to the face. The second friction material has a second composition that is different than the first composition and includes a second filler material at a second weight concentration of a total weight of the second friction material that is higher than the first weight concentration.

According to yet another embodiment, a friction plate for a clutch includes first patches of friction material disposed on a face of the friction plate. The first friction material has a first composition including a first filler material at a first weight concentration of a total weight of the first friction material. At least one second patch of friction material is also disposed on the face. The second friction material has a second composition that is different than the first composition and includes a second filler material at a second weight concentration of a total weight of the second friction material that is higher than the first weight concentration.

DETAILED DESCRIPTION

Figure 1:
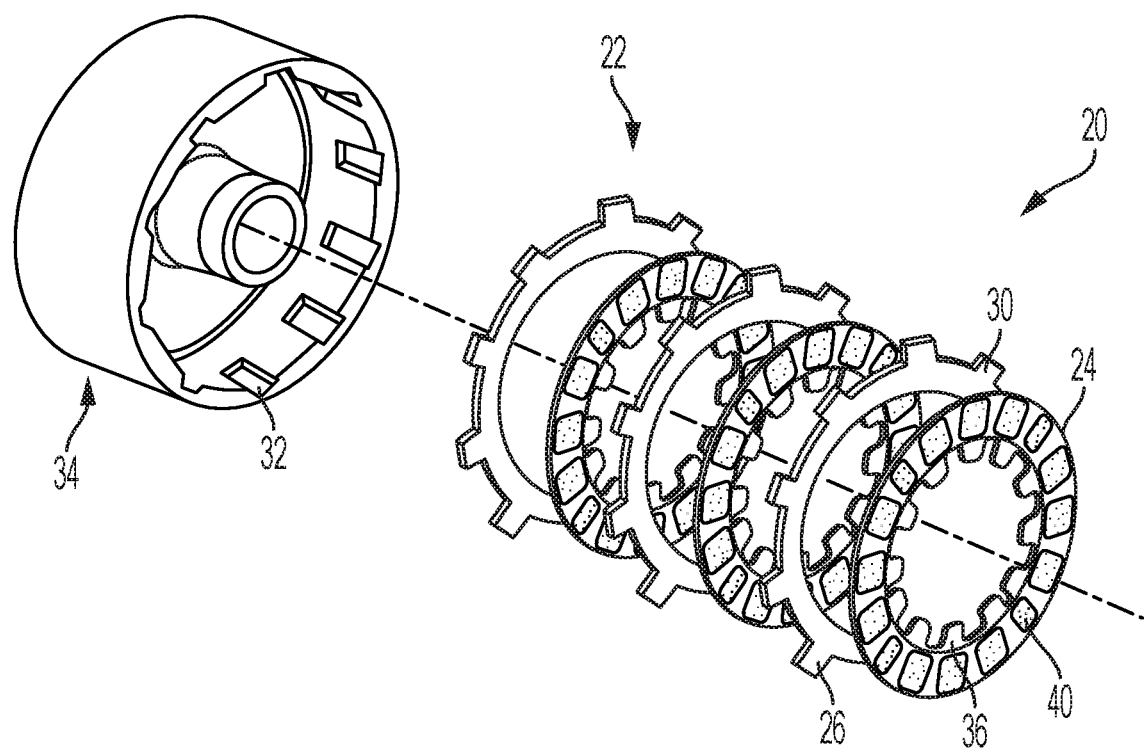
FIG. 1 a schematic exploded perspective view of a clutch.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

Referring to FIG. 1, a wet clutch 20 includes at least one clutch pack 22 having a plurality of friction plates 24 (also known as clutch plates, etc.) and a plurality of pressure plates 26 (also known as steel plates, bands, etc.). The friction plates 24 are interleaved with the pressure plates 26 such that the friction plates 24 and the pressure plates 26 alternate along a length of the pack 22. The friction plates 24 are rotationally fixed to a first component and the pressure plates 26 are rotationally fixed to a second component. The clutch 20 is configured to rotationally lock the first and second components to each other when the clutch is fully engaged. For example, the pressure plates 26 may include fingers 30 that spline with grooves 32 defined in a drum 34, and the friction plates 24 may include teeth 36 that spline with grooves defined in a shaft or other component (not shown). An actuator (not shown) is configured to compress the clutch pack 22 to engage the clutch 20 and release the clutch pack 22 to disengage the clutch 20.

A first wet friction material 40 may be applied to one or both faces of the friction plates 24. The friction material 40 cooperates with a lubricant (oil) that includes a friction modifier to facilitate frictional engagement between the friction plates 24 and the pressure plates 26. A typical lubricant is automatic transmission fluid (ATF). ATF includes a friction modifier, also referred to as an additive, component, or ingredient, that facilitates engagement and disengagement of the clutch pack 22. These modifiers are well known and will not be discussed herein.

A wet friction material 40 may include one or more fiber materials (fiber), one or more filler materials (filler) having a plurality of particles, and a binder. A total weight of the friction material 40 is a summation of fiber, filler, and binder. The first friction material 40 includes more fiber than filler. An example first friction material 40 has a first composition including a first filler material at a first weight concentration of less than 32 percent by weight of a total weight of the first friction material. In some embodiments, the first weight concentration is between 20 to 30 percent by weight of the total weight of the first friction material. The first friction material 40 may have between 35 to 45 percent fibers by total weight of the first friction material. The fiber may be organic or inorganic, and examples include, but are not limited to, cellulose fibers, cotton fibers, aramid fibers, and carbon fibers. Example binders include, but are not limited to, modified phenolic resin, polymeric paper processing aids, silane, coupling agents, and combinations thereof.

The filler is configured to carry the friction modifier. The filler may carry the friction modifier via surface interactions with the friction modifier, for example, by having a particle shape conducive to carrying the friction modifier, by having a particle size conductive to carrying the friction modifier, by pores sized to carry the friction modifier, or any combination thereof.

The filler may include silica particles that contain diatomaceous earth (DE) particles. DE is a natural silica formed from the sedimentation of single cell aquatic organisms called diatoms. DE can form in Marine or freshwater environments and exhibits properties that are related to their unique shape and structure. These properties vary according to the diatom species found in each deposit. For example, these different deposits may have differing chemistries, shapes, pore structures, and the like. Some examples of silica containing DE particles are Celite® 281, DiaFil® 230, and CelTiX™. Celite® 281 is a flux-calcined diatomaceous earth of plankton marine diatomite; DiaFil® 230 is a natural diatomaceous earth; and CelTiX™ is a fine, natural freshwater diatomaceous earth product, with excellent reinforcing ability in most types of elastomer. Silica is also referred to as silicon dioxide. The diatomaceous earth generally contains about ten percent other oxides besides silica and is substantially devoid of crystalline silica. Typically, diatomaceous earth is amorphous.

In an example aspect, the silica rich carrier particles have a median particle size of at least 0.1 micrometers (μm) and at most 50 μm; in other example embodiments a median particle size of at least 1 μm and at most 20 μm; in another example embodiment a median particle size of at least 5 μm and at most 15 μm; in yet other example embodiment a median particle size of at least 9 μm and at most 11 μm; and, in further examples a median particle size of about 10 μm.

In an example embodiment, the silica particles have a median pore diameter of at least 0.1 and at most 10 μm; in other example embodiments a median pore diameter of at least 0.5 and at most 7 μm; in another example embodiment a median pore diameter of at least 0.5 and at most 5 μm; in yet another example embodiments a median pore diameter of at least 1 and at most 3 μm; and, in further example embodiments the median particle size is about 2 μm.

The silica rich particles may provide improved and increased interaction with friction modifiers compatible with ATF, while also providing for better performance. The silica rich particles of the aforementioned median particle size and/or having the aforementioned median pore size may allow ATF to flow easily through the filler, thus distributing the lubricant evenly for improved performance.

One failure mode for wet clutches is surface plugging (also known as glazing failure) of the friction materials on the friction plates. Surface plugging occurs when surface temperatures of the friction material and the pressure plates exceed a threshold temperature causing the ATF modifiers to decompose and deposit on the friction material. The ATF modifiers will continue to decompose during excessively high-temperature operation and accumulate more and more on the friction material surface until the surface is plugged, e.g., glazed. Glazing reduces the friction coefficient of the friction material and can lead to clutch shudder as the condition worsens, i.e., becomes more and more plugged, over time. Once surface plugging reaches a critical point, the friction plate is considered glazed and must be replaced.

In automotive applications, short instances of excessive heat in the clutch pack are common and are not, individually, problematic. If these instances are too frequent, however, glazing can reduce the life of the clutch pack. Since surface plugging builds-up over time, preventive maintenance can be employed to remove the decomposed ATF modifiers as they build to prevent excessive accumulation and reduce the likelihood of the friction plates becoming glazed, thus extending the life of the clutch pack.

Preventive maintenance, in the common sense of a person performing it, is not practical here as the clutch packs are internal to the transmission or other component. Instead, this disclosure sets forth clutch packs that perform automatic preventive maintenance. That is, the clutch pack includes features for removing decomposed ATF modifiers from the friction surface to reduce surface plugging. According to one or more embodiments, wipers (a special type of friction material) can be provided on the faces of the friction plates. The wipers are designed to wear and distribute abrasive particles between the friction plates and the pressure plates. These abrasive particles scrub the decomposed ATF modifiers during operation of the clutch to reduce surface plugging as it builds. The wipers may be patches of a second friction material interspersed with patches of first friction material on the faces of the friction plates.

Figure 2:
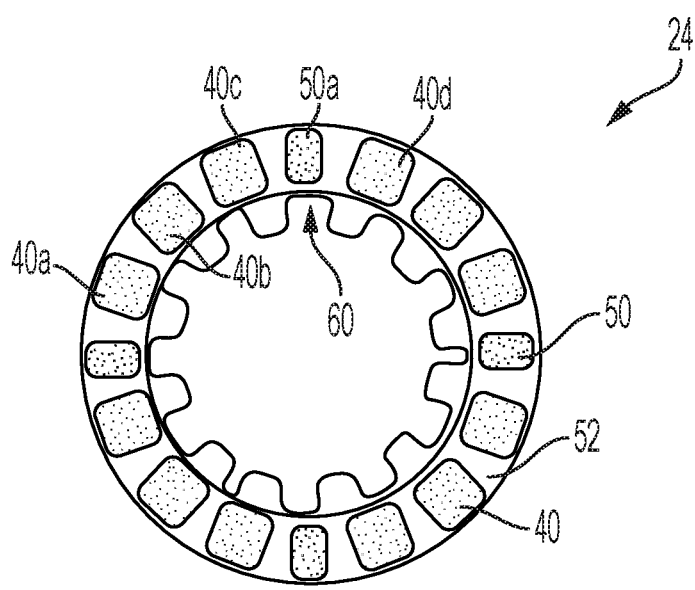
FIG. 2 is a front view of a friction plate of the clutch of FIG. 1.

Referring to FIG. 2, the friction plates 24 may include at least one wiper (second friction material) 50 on one or both faces 52 of the plates. The wipers 50 are a friction material that include filler, fiber, and binder, but, unlike the first friction material 40, the wipers 50 includes more filler than fiber. The wipers 50 have a second composition that is different than the first composition of the first friction material 40. The second composition includes a second filler material at a second weight concentration of the total weight of the wiper 50 that is higher than the first weight concentration of the friction material 40. In one or more embodiments, the second weight concentration is greater than 30 percent by weight of the total weight of the wiper 50 and may be between 39 to 46 percent, inclusive, by weight of the total weight of the wiper 50.

In one embodiment, diatomaceous earth (DE) is used as a filler for the wiper 50 as the abrasive properties (6-9 Mohs hardness) and the particle size (10-50 μm) are well suited for removing decomposed ATF modifiers from the friction material 40 without damaging other components in the clutch pack 22. The filler of the wipers 50, however, is not limited to DE and other suitable fillers having similar hardness and particle size may be used. These include silicon nitride, chromium oxide, glass particles, quartz, feldspar, iron oxide, nepheline syenite.

The fibers may be of similar materials to the first friction material 40 and includes both organic or inorganic compounds. The concentration of fibers in the wiper 50 is less than the fiber concentration in the first friction material 40. The wiper 50 includes less than 32 percent fiber by total weight of the wiper. For example, the wiper 50 may include 19 to 26 percent, inclusive, by weight of the total weight of the wiper 50.

The binder of the wipers 50 may be softer than the binder used in the first friction material 40. For example, the binder of the wipers 50 may have up to 50 percent silane coupling agent by total weight of the binder. This may promote faster wearing of the wipers 50 and increase flexibility to help maintain the wiper 50 in contact with the clutch plates. The binder of the wipers 50 may also include typical binder materials such as phenolic resin.

The wipers 50 and the friction material 40 may be patches of friction material that are arranged on one or both of the faces 52. The patches of friction material 40 may have a larger surface area than the patches of wipers 50. The patches of wipers 50 and the patches of friction material 40 may be circumferentially arranged around the face 52 with spacing in between to the place the wipers 50 and the friction material 40 in different regions of the face 52. In the illustrated embodiment, the face 52 includes four wipers 50, but more or less wipers may be used in other embodiments. For example, one or two wipers may be used. The wipers 50 may be equally spaced (as shown at 90 degrees spacing) or may be unequally spaced.

The friction material 40 may be equally spaced in some areas and have larger spacing in other areas to create gaps for the wipers 50. For example, the friction material 40a, 40b, and 40c are equally spaced whereas friction material 40c and 40d are a larger spacing to create a gap 60 for the wiper 50a.

During operation of the clutch 20, each wiper 50 engages with a respective pressure plate 26 when the clutch pack 22 is compressed. Friction between the wiper 50 and the pressure plates 26 causes the wipers 50 to wear releasing filler, which are abrasive particles, onto the face of the pressure plates 26. These particles flow between the pressure plates 26 and the friction material 40 and abrades ATF modifier deposits off the surface of the friction materials 40 to reduce surface plugging. The abrasive particles are chosen to not cause excessive wear on the friction material 40. The abrasive particles are also softer than the pressure plates 26, typically steel, and do not cause excessive wear on the pressure plates.

Figure 3:
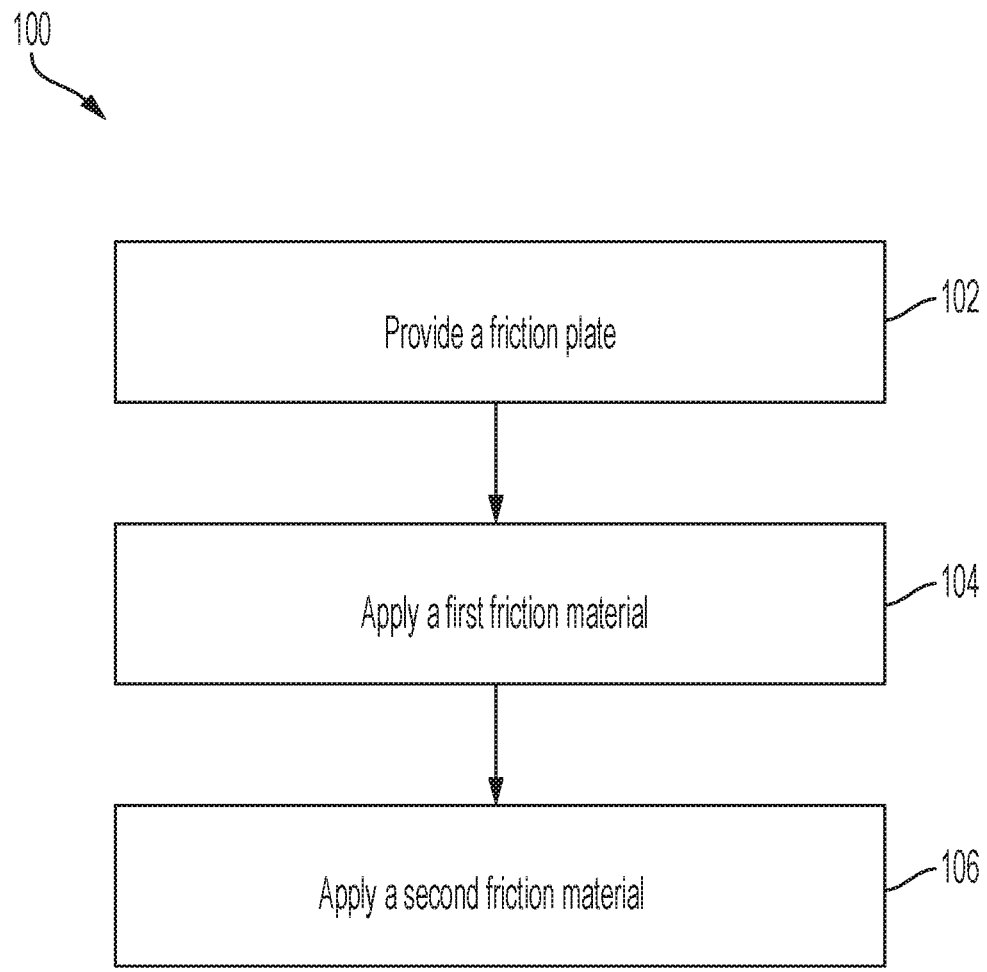
FIG. 3 is a flow chart of a method for manufacturing a friction plate of a clutch.

Referring to FIG. 3, a method 100 of manufacturing a pressure plate is disclosed. While presented in a particular order, it is to be understood that the method can be performed in a different order. Furthermore, additional steps may also be included in conjunction with the described steps, and one or more of the described steps may be omitted in some embodiments.

At step 102, a friction plate is provided. At step 104, a first friction material is applied to one or more faces of the friction plate. The first friction material may be the same or similar to the above-described friction material 40. The first friction material may be patches as described above. The friction plate may include a plurality of regions and the patches of first friction material may be placed in first ones of the regions. Some of the patches of first friction material may be circumferentially spaced at a larger interval to create one or more gaps for a second friction material (wiper).

At step 106, a second friction material (one or more wipers) is applied to one or more faces of the friction plate. The second friction material may be the same or similar to the above-described wiper 50. The second friction material may be patches as described above. The one or more patches of second friction material are applied to the face in the gaps. The patches of second friction material may be placed in second ones of the regions of the plate so that the first and second friction materials are circumferentially arranged around the pressure plate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 22 clutch pack
24 friction plates
26 pressure plates
30 fingers
32 grooves
34 drum
36 teeth
40 first friction material
50 wipers
52 face
60 gap

What is claimed is:
1. A friction plate for a clutch comprising:
a face;

a first friction material disposed on the face and having a first composition including a first filler material at a first weight concentration of a total weight of the first friction material; and
a second friction material disposed on the face and having a second composition that is different than the first composition and including a second filler material at a second weight concentration of a total weight of the second friction material that is higher than the first weight concentration.

2. The friction plate of claim 1, wherein the first friction material further has a first fiber material and a first binder, and the total weight of the first friction material includes the first filler material, the first fiber material, and the first binder, and wherein the second friction material further has a second fiber material and a second binder, and the total weight of the second friction material includes the second filler material, the second fiber material, and the second binder.

3. The friction plate of claim 2, wherein the first weight concentration is less than 30 percent by weight of the total weight of the first friction material and the second weight concentration is greater than 32 percent by weight of the total weight of the second friction material.

4. The friction plate of claim 2, wherein the second weight concentration is between 39 to 46 percent, inclusive, by weight of the total weight of the second friction material.

5. The friction plate of claim 4, wherein the first weight concentration is between 20 to 30 percent, inclusive, by weight of the total weight of the first friction material.

6. The friction plate of claim 1, wherein the second filler material includes diatomaceous earth.

7. The friction plate of claim 6, wherein the second filler material includes at least 50 percent of the diatomaceous earth by weight.

8. The friction plate of claim 1, wherein the face includes a plurality of regions, and the first and second friction materials are located in different ones of the regions.

9. The friction plate of claim 8, wherein the first and second friction materials are formed as discrete first and second patches, and the first and second patches are circumferentially arranged around the face.

10. The friction plate of claim 9, wherein the face includes more first patches than second patches.

11. A method of manufacturing a friction plate comprising:
applying a first friction material to a face of a friction plate, the first friction material having a first composition including a first filler material at a first weight concentration of a total weight of the first friction material; and
applying a second friction material to the face, the second friction material having a second composition that is different than the first composition and including a second filler material at a second weight concentration of a total weight of the second friction material that is higher than the first weight concentration.

12. The method of claim 11, wherein the first friction material further has a first fiber material and a first binder, and the total weight of the first friction material includes the first filler material, the first fiber material, and the first binder, and wherein the second friction material further has a second fiber material and a second binder, and the total weight of the second friction material includes the second filler material, the second fiber material, and the second binder, and wherein the first weight concentration is less than 30 percent by weight of the total weight of the first friction material and the second weight concentration is greater than 32 percent by weight of the total weight of the second friction material.

13. The method of claim 11, wherein the disk includes a plurality of regions, and the first friction material is applied to first ones of the regions and the second friction material is applied to second ones of the regions such that the first and second friction materials are circumferentially spaced around the face.

14. The method of claim 11, wherein the applying the first friction material further includes adhering a plurality of first patches of the first friction material on the face with the first patches circumferentially spaced to define at least one gap, and the applying the second friction material further includes adhering at least one second patch of the second friction material on the face in the at least one gap.

15. The method of claim 11, wherein the second filler material includes at least 50 percent of diatomaceous earth by weight.

16. A friction plate for a clutch comprising:
a face;
patches of friction material disposed on the face and having a first composition including a first filler material, a first fiber material, and a first binder forming a total weight of the friction material, wherein the first filler material is at a first weight concentration of less than 30 percent by weight of the total weight of the friction material; and
at least one wiper patch disposed on the face and having a second composition that is different than the first composition and including a second filler material, a second fiber material, and a second binder forming a total weight of the wiper patch, wherein the second filler material is at a second weight concentration that is greater than 32 percent of the total weight of the wiper patch, and wherein the second binder includes a silane coupling agent configured to, in combination with the second composition, soften the wiper patch compared to the friction material such that a portion of the second filler of the wiper patch is released during operation of the friction plate to scrub deposits of decomposed transmission fluid from the friction material to inhibit surface plugging.

17. The friction plate of claim 16, wherein the face includes a plurality of regions, and the patches of friction material and the wiper patch are located in different ones of the regions.

18. The friction plate of claim 16, wherein the at least one wiper patch is at least two wiper patches.

19. The friction plate of claim 16, wherein the second weight concentration is between 39 to 46 percent, inclusive, by weight of the total weight of the wiper patch.

20. The friction plate of claim 16, wherein the second filler material includes diatomaceous earth.

* * * * *